(12) United States Patent
Tayal et al.

(10) Patent No.: US 10,701,601 B1
(45) Date of Patent: Jun. 30, 2020

(54) SYSTEM, METHOD, AND COMPUTER PROGRAM FOR FAILURE AVOIDANCE DUE TO DISCONTINUOUS RECEPTION (DRX) CONFIGURATION ISSUES

(71) Applicant: Amdocs Development Limited, Limassol (CY)

(72) Inventors: Sagar Tayal, Ambala (IN); Ram Kumar Sharma, Rajasthan (IN); Krishnan Venkataraghavan, Chennai (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/459,442

(22) Filed: Jul. 1, 2019

Related U.S. Application Data (60) Provisional application No. 62/696,761, filed on Jul. 11, 2018.

(51) Int. Cl.
*H04W 36/00* (2009.01)
*H04W 76/28* (2018.01)

(52) U.S. Cl.
CPC ....... *H04W 36/0079* (2018.08); *H04W 76/28* (2018.02)

(58) Field of Classification Search
CPC .......................... H04W 36/0079; H04W 76/28
See application file for complete search history.

(56) References Cited

U.S. PATENT DOCUMENTS

| 2008/0285509 | A1* | 11/2008 | Womack | H04W 76/28 370/329 |
|---|---|---|---|---|
| 2017/0318536 | A1* | 11/2017 | Manepalli | H04W 52/0245 |
| 2018/0279408 | A1* | 9/2018 | Jha | H04W 52/0216 |

* cited by examiner

*Primary Examiner* — Nizar N Sivji
(74) *Attorney, Agent, or Firm* — Zilka-Kotab, P.C.

(57) ABSTRACT

A system, method, and computer program product are provided for failure avoidance due to Discontinuous Reception (DRX) configuration issues. In operation, a system checks DRX parameters for preventing non-compliant DRX parameters in an eNodeB (eNB) and performs autocorrection of non-compliant to compliant DRX parameters. The DRX parameters may be checked by the eNB or by any OEM. The system also identifies a cause of reconfiguration failure by user equipment (UE).

16 Claims, 9 Drawing Sheets

SYSTEM, METHOD, AND COMPUTER PROGRAM FOR FAILURE AVOIDANCE DUE TO DISCONTINUOUS RECEPTION (DRX) CONFIGURATION ISSUES

RELATED APPLICATION(S)

The present application claims priority to U.S. Provisional Application 62/696,761, filed Jul. 11, 2018, and titled "SYSTEM, METHOD, AND COMPUTER PROGRAM FOR FAILURE AVOIDANCE DUE TO DISCONTINUOUS RECEPTION (DRX) CONFIGURATION ISSUES", the contents of which are herein incorporated by reference in their entirety.

FIELD OF THE INVENTION

The present invention relates to wireless communication networks and, more particularly, to methods and a system for failure avoidance due to DRX configuration issues.

BACKGROUND

In a wireless communication, user equipment (UE) monitors a downlink (DL) channel (Physical Downlink Control Channel, PDCCH) in a continuous manner. The continuous monitoring of a PDCCH increases the power consumption of the UE. DRX functionality is used in the UE to reduce the power consumption. The power consumption is reduced by stopping the PDCCH monitor for a certain time-period referred to as a DRX activity timer.

In some scenarios, there may be DRX configuration issues from an eNodeB (eNB). In such scenarios, a UE of the eNB may trigger a radio connection reestablishment. The UE may keep trying for a connection reestablishment to a neighboring eNB with better radio condition. However, the neighboring eNB may be non-compliant and the UE may not be able to latch to a network of the neighboring eNB. The non-compliant eNB may include DRX parameters with non-compliant values that may cause DRX configuration issues. Thus, the DRX configuration issues due to non-compliant DRX values prevent reestablishing a connection between the UE and the eNB with better radio condition.

There is thus a need for addressing these and/or other issues associated with the prior art.

SUMMARY

A system, method, and computer program product are provided for failure avoidance due to Discontinuous Reception (DRX) configuration issues. In operation, a system checks DRX parameters for preventing non-compliant DRX parameters in an eNodeB (eNB) and performs autocorrection of non-compliant to compliant DRX parameters. The DRX parameters may be checked by the eNB or by any OEM. The system also identifies a cause of reconfiguration failure by user equipment (UE).

DETAILED DESCRIPTION

Figure 1:
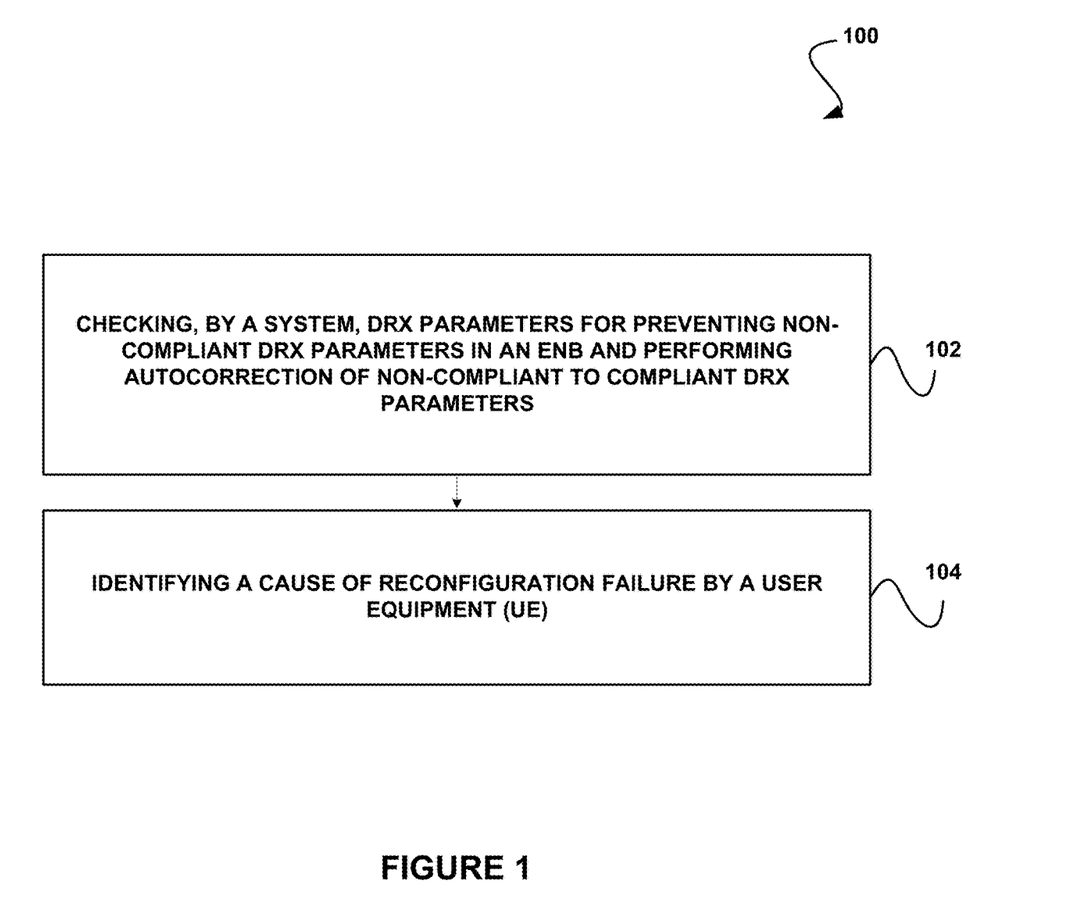
FIG. 1 illustrates a method for failure avoidance due to Discontinuous Reception (DRX) configuration issues, in accordance with one embodiment.

FIG. 1 illustrates a method 100 for failure avoidance due to Discontinuous Reception (DRX) configuration issues, in accordance with one embodiment.

In operation, a system checks DRX parameters for preventing non-compliant DRX parameters in an eNodeB (eNB) and performs autocorrection of non-compliant to compliant DRX parameters. See operation 102. The DRX parameters may be checked by the eNB or by any OEM.

The system also identifies a cause of reconfiguration failure by a user equipment (UE). See operation 104. The UE may include a mobile phone, etc.

The method 100 allows for mitigation of DRX configuration issues by checking for compliant values of DRX parameters by an eNB or by any original equipment manufacturer. A UE sends a reason code "Reconfiguration failure due to DRX values noncompliance" to an eNB indicating cause of reconfiguration failure due to non-compliant DRX values. Autocorrection of non-compliant DRX values to compliant DRX values by an eNB after a "RRCReconfigurationfailure-Drxissue" counter is initiated in the eNB. The eNB then sends a "DRX Check" flag to neighboring eNBs via X2 link to perform autocorrection if neighboring eNBs of the eNB are non-compliant.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
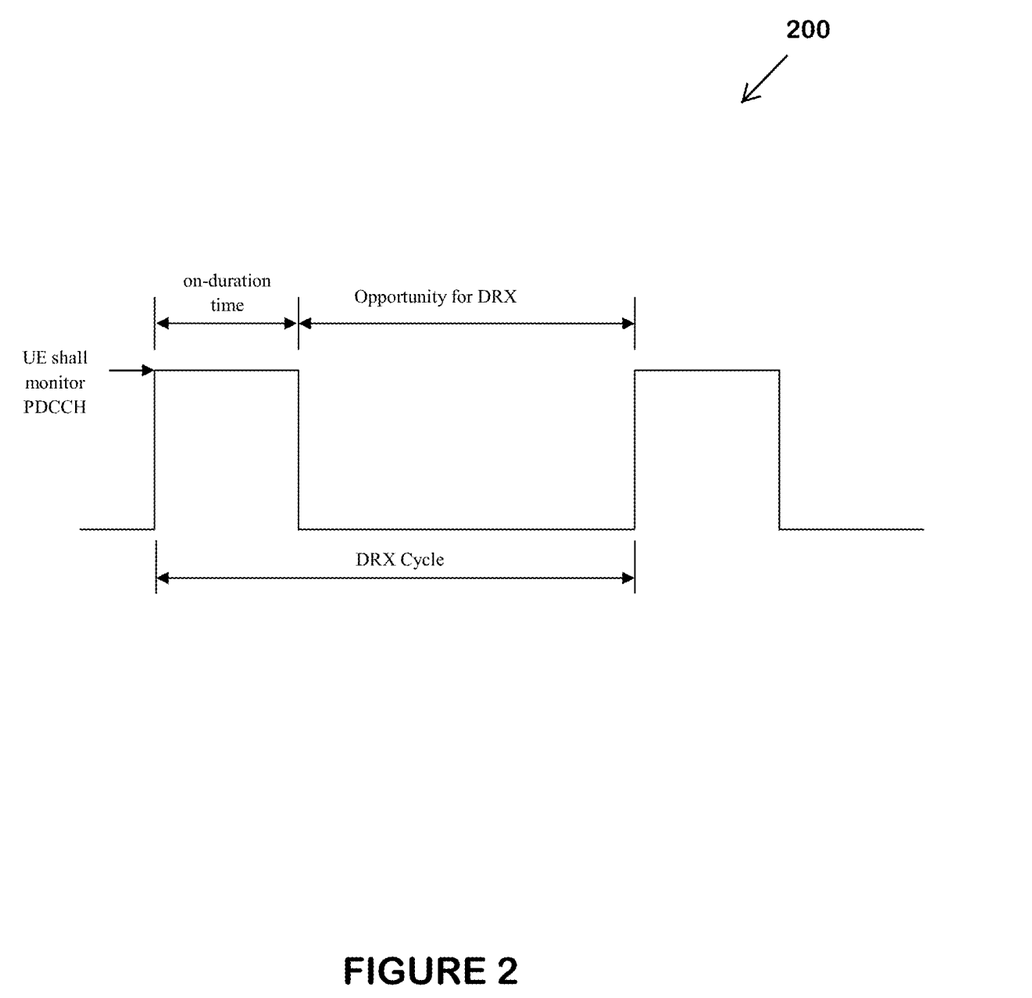
FIG. 2 shows a diagram showing a DRX cycle, in accordance with one embodiment.

FIG. 2 shows a diagram 200 showing a DRX cycle, in accordance with one embodiment. As an option, the diagram 200 may be implemented in the context of the details of the previous figure and/or any subsequent figure(s). Of course, however, the diagram 200 may be implemented in the context of any desired environment. Further, the aforementioned definitions may equally apply to the description below.

Generally, DRX is implemented in cycles, as shown in the diagram 200. After a DRX activity timer, a UE starts monitoring a downlink channel PDCCH. The DRX cycle has an on-duration time during which the UE monitors the PDCCH. When the on-duration time expires, the DRX stops the UE from monitoring the PDCCH so that power consumed for monitoring PDCCH can be saved. The DRX includes various parameters such as long DRX cycle, DRX inactivity timer, DRX retransmission timer, short DRX cycle, and short DRX cycle timer that are described in 1-8 below.

1) Active Time: The active time is the amount of time a UE is awake. When DRX is configured by a higher layer, the active time includes an on-duration time, a time when the UE continuously monitors the PDCCH while DRX inactivity timer has not expired, and a time for which the UE continuously monitors the PDCCH while the DRX Retransmission timer has not expired.

2) DRX Cycle: DRX cycle specifies a periodic repetition of the on-duration time followed by a possible period of DRX inactivity.

3) DRX inactivity Timer: The DRX inactivity timer specifies a number of consecutive transmission time intervals (TTIs) for which the UE shall monitor the PDCCH after successfully decoding a PDCCH. The DRX inactivity timer indicates an initial uplink (UL) or a downlink (DL) of user data transmission for the UE.

4) DRX Retransmission Timer: The DRX retransmission timer specifies the number of consecutive TTIs the UE shall monitor the PDCCH for as soon as a DL retransmission is expected by the UE.

5) On-duration Timer: The on-duration timer is a part of the DRX Cycle. The timer specifies number of consecutive TTIs the UE shall monitor the PDCCH for possible allocations.

6) LongDRX-CycleStartOffset: The value of a LongDRX-Cycle is in number of sub-frames. For instance, a longDRX-cycle with a value of sf10 corresponds to 10 sub-frames, sf20 corresponds to 20 sub-frames, and so on. If shortDRX-cycle is configured, the value of longDRX-Cycle needs to be a multiple of the shortDRX-cycle value.

7) DRX Short Cycle Timer: The DRX Short Cycle Timer parameter specifies the number of consecutive TTIs the UE shall follow the short DRX cycle after the DRX Inactivity Timer has expired. It may be noted that the drxShortCycleTimer value is in multiples of shortDRX-Cycle. For instance, a drxShortCycleTimer value of 1 corresponds to 1 shortDRX-cycle, value of 2 corresponds to 2*shortDRX-cycle, and so on.

8) shortDRX-cycle: The ShortDRX-cycle is represented in sub-frames (sf). For instance, a ShortDRX cycle with a value of sf2 corresponds to two sub-frames, sf5 corresponds to five sub-frames, and so on.

The parameters of the DRX such as on-duration timer, DRX inactivity timer, DRX retransmission timer, LongDRX-CycleStartOffset, short DRX cycle, and short DRX cycle timer are defined in a message body as per 3GPP standards, as is shown in Table 1.

TABLE 1

```
DRX-Config ::= CHOICE {
release NULL,
setup SEQUENCE {
onDurationTimer ENUMERATED { psf1, psf2, psf3, psf4, psf5, psf6, psf8, psf10, psf20,
psf30, psf40, psf50, psf60, psf80, psf100, psf200 {,
drx-InactivityTimer ENUMERATED { psf1, psf2, psf3, psf4, psf5, psf6, psf8, psf10, psf20,
psf30, psf40, psf50, psf60, psf80, psf100, psf200, psf300, psf500, psf750, psf1280, psf1920,
psf2560, psf0-v1020, spare9, spare8, spare7, spare6, spare5, spare4, spare3, spare2, spare1},
drx-RetransmissionTimer ENUMERATED { psf1, psf2, psf4, psf6, psf8, psf16, psf24, psf33},
longDRX-CycleStartOffset CHOICE { sf10 INTEGER(0..9), sf20 INTEGER(0..19), sf32
INTEGER(0..31), sf40 INTEGER(0..39), sf64 INTEGER(0..63), sf80 INTEGER(0..79), sf128
INTEGER(0..127), sf160 INTEGER(0..159), sf256 INTEGER(0..255), sf320
INTEGER(0..319), sf512 INTEGER(0..511), sf640 INTEGER(0..639), sf1024
INTEGER(0..1023), sf1280 INTEGER(0..1279), sf2048 INTEGER(0..2047), sf2560
INTEGER(0..2559) },
shortDRX SEQUENCE {
shortDRX-Cycle ENUMERATED { sf2, sf5, sf8, sf10, sf16, sf20, sf32, sf40, sf64, sf80, sf128,
sf160, sf256, sf320, sf512, sf640},
drxShortCycleTimer INTEGER (1..16) }
OPTIONAL -- Need OR
}
}
```

Device End (at UE) Feature Group Indicators (FGI) bit support: At UE, to support Long Drx and Short DRX, Bit 4 & Bit 5 of FGI needs to be enabled. 0.1 . . . =Indicator 4: Short DRX cycle—Supported. 1 . . . =Indicator 5: Long DRX cycle; DRX command MAC control element—Supported.

It may be noted that if a longDRX-cycle is configured along with a shortDRX-cycle then values of both the long and short DRX cycles are checked as per 3GPP standards. The long DRX and short DRX cycles may be configured in DRX parameters for a UE. However, the UE may be required to follow both the cycles according to the DRX parameters. An eNB (or any OEM) may check long DRX cycle and short DRX cycle values. Only a subset value of compliant values, i.e., short DRX value which is multiple of the long DRX value will be allowed for short cycle. As per the 3GPP standards, the value of longDRX-cycle is in number of sub-frames. If the shortDRX-cycle is configured along with longDRX-cycle then the value of longDRX-cycle needs to be in multiple of shortDRX-cycle value. In case, the long DRX is not multiple of the short DRX cycle then the UE may trigger a radio link failure (RLF) and may perform radio reestablishment (RRE) identifying cause of reconfiguration failure.

If non-compliant DRX configurations are being sent from an eNB to a UE after checking the DRX parameters, then the UE may send the reason code. For instance, instead of sending reason code as "Reconfiguration Failure", the UE sends a reason code as "Reconfiguration failure due to DRX values non-compliance". Furthermore, a counter represented by parameter "RRCReconfigurationfailure-DRXissue" counter is used to count occurrence of DRX configuration issues. The counter increments whenever DRX configuration issues are reported. When the counter "RRCReconfigurationfailure-DRXissue" is initiated the eNB autocorrects the short DRX timer or long DRX cycle values to default compliance value that is closest to a current setting of the eNB. Thus, the autocorrection allows changing of non-compliant values in DRX configuration parameter into compliant values.

After the autocorrection of the DRX parameters, the eNB sends a flag value "DRX Flag" on X2 link. The DRX Flag is sent to immediate neighboring eNBs of the eNB to check on DRX values configured. If there are non-compliant neighboring eNBs, then "Reconfigurationfailure-Drxissue" counter of the non-compliant eNB will be incremented and accordingly autocorrects itself with compliant values.

Figure 3:
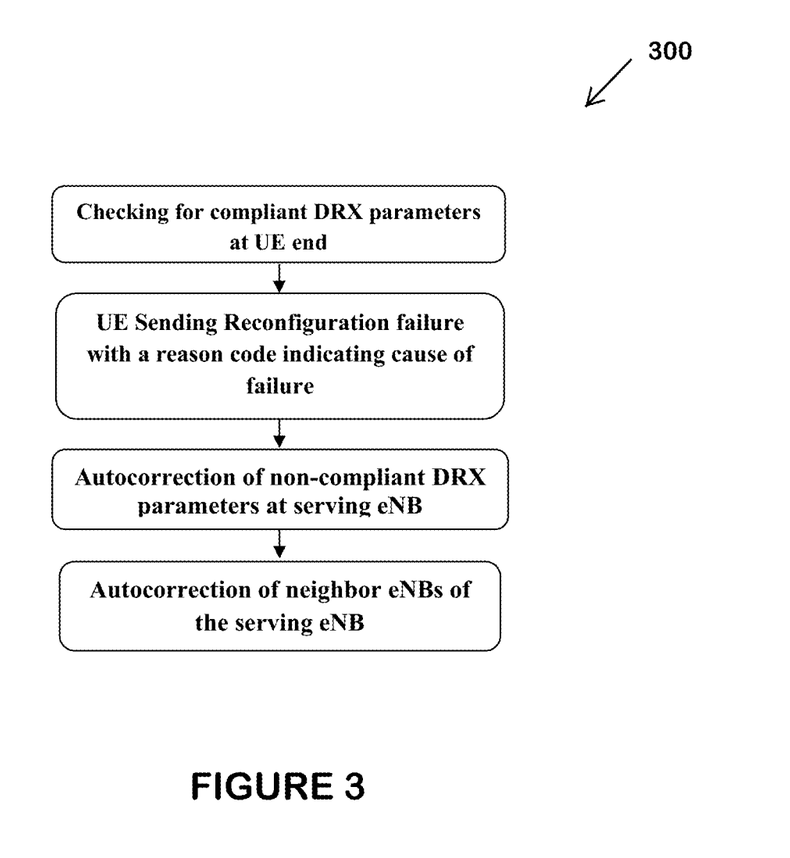
FIG. 3 shows a diagram showing steps to avoid DRX reconfiguration failure issues due to non-compliant DRX values, in accordance with one embodiment.

FIG. 3 shows a diagram 300 showing steps to avoid DRX reconfiguration failure issues due to non-compliant DRX values, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

1) Checking for compliant DRX parameters at UE end: The eNB or any OEM checks for compliant values of DRX parameters. If there are non-compliant values of DRX then there may be reconfiguration failure.

2) UE Sending Reconfiguration failure with a reason code indicating cause of failure: After the process of checking for compliant values of DRX parameters, if any problem arises due to some non-compliant configurations from the eNB, then the UE responds with a message indicating cause of reconfiguration failure as "Reconfiguration failure due to DRX values non-compliance".

3) Autocorrection of non-compliant DRX parameters at serving eNB: The eNB has a counter that increments whenever the UE sends the message of "Reconfiguration failure due to DRX values non-compliance". Whenever the counter is incremented, the eNB autocorrects the non-compliant DRX parameters to compliant DRX parameters.

4) Autocorrection of neighbor eNBs of the serving eNB: A "DRX Check" flag is sent to a neighboring eNB of the serving eNB via an X2 link to check for compliant DRX configurations. If the neighboring eNB is non-compliant then the counter Reconfigurationfailure-DRXissue of the neighboring eNB is incremented and performs autocorrection.

Figure 4:
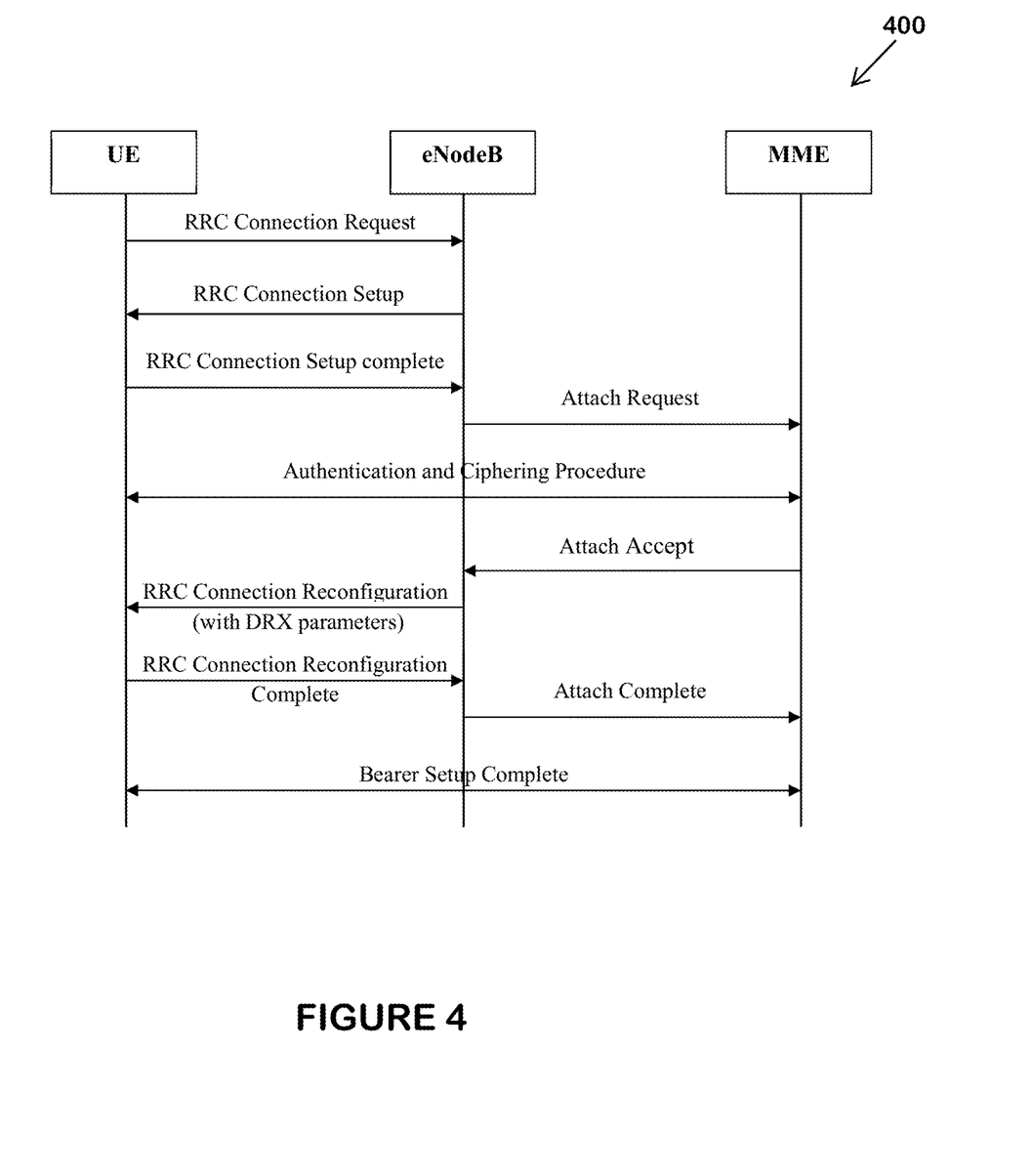
FIG. 4 shows a diagram showing a communication flow between user equipment and an eNB of a network that for a successful attach procedure in a call, in accordance with one embodiment.
Figure 5:
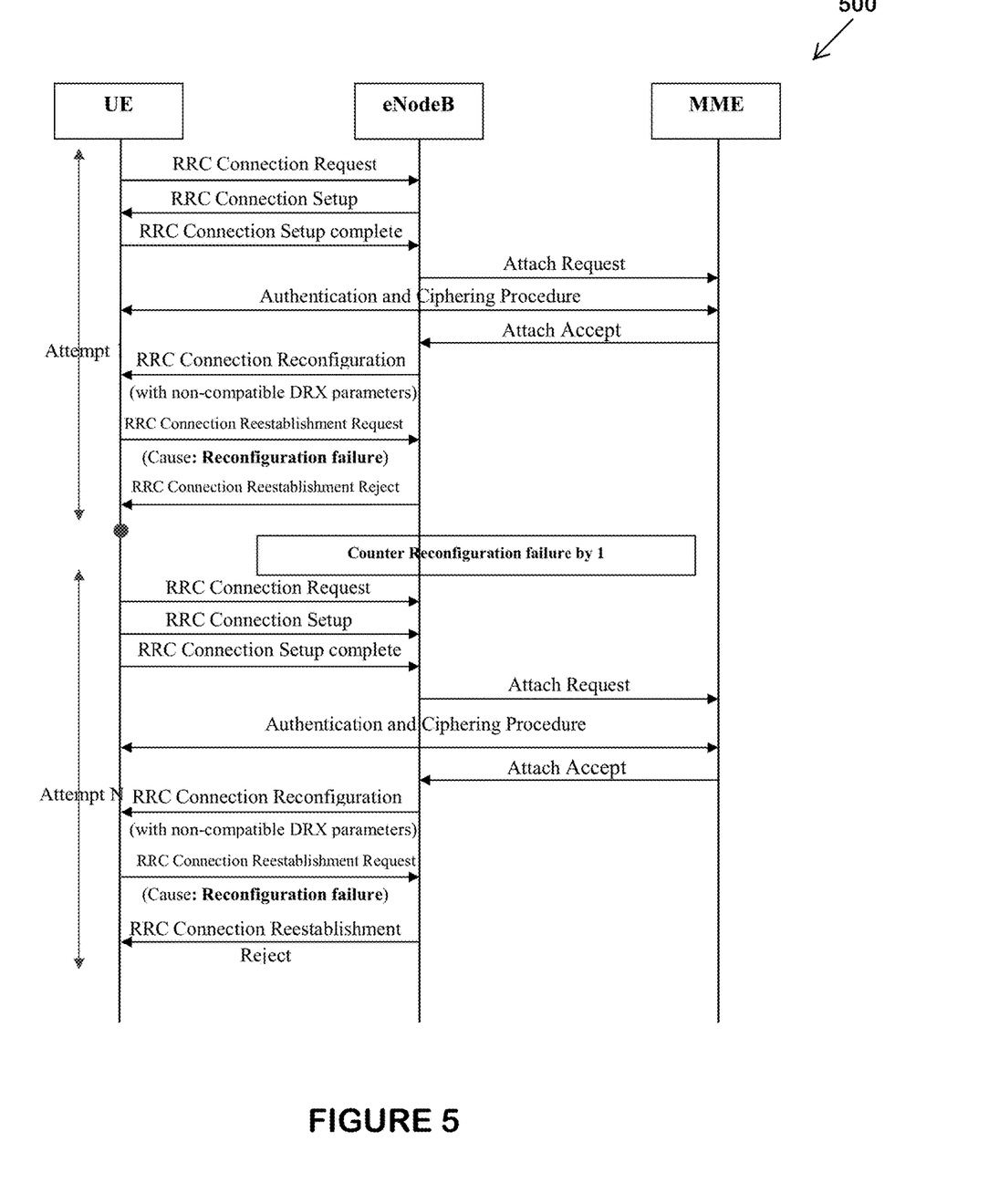
FIG. 5 shows a diagram showing a communication flow between a UE and an eNB of a network that for an abnormal attach procedure in a call, in accordance with one embodiment.

The DRX configuration issues are described further in the context of FIGS. 4 and 5.

FIG. 4 shows a diagram 400 showing a communication flow between a UE and an eNB of a network that for a successful attach procedure in a call, in accordance with one embodiment. As an option, the diagram 400 may be implemented in the context of the details of the previous figures and/or any subsequent figure(s). Of course, however, the diagram 400 may be implemented in the context of any desired environment. Further, the aforementioned definitions may equally apply to the description below.

Step 1: Initially, the UE sends an RRC Connection Request message to an eNB via an uplink shared channel (UL-SCH). A cell-radio network temporary identifier (C-RNTI) is assigned to the UE in the random-access response message. The message contains a UE identity of the UE which is typically an SAE temporary mobile subscriber identity (S-TMSI). The S-TMSI allows the UE to be identified within an MME group locally. The message further includes an establishment cause for the RRC connection.

Step 2: After receiving the request from UE, eNB responds with RRC Connection Setup message on the down-link shared channel (DL-SCH). The setup message creates signaling radio bearer (SRB) in acknowledged mode. The setup message also contains configuration parameters for uplink radio link control (RLC), UL-SCH, power head room (PHR) and uplink power control.

Step 3: The UE signals the setup of RRC connection (RRC Connection Setup Complete). The message is also used to initiate the attach procedure by sending an Attach Request as non-access stratum (NAS) payload. The NAS is a layer which supports traffic and signaling messages between the network and UE. The attach message also contains an old globally unique temporary identifier (GUTI) to identify the UE.

Step 4: The Attach Request message is sent in the initial UE message to the MME over S1 application protocol (S1AP) interface. The Attach Request message is embedded in the initial UE message. The Attach Request message contains tracking area identify (TAI) and E-UTRAN cell global identifier (ECGI). It may be noted here the eNB uses eNB-UE-S1APID to uniquely identify the UE.

Step 5: The Authentication and Ciphering Procedure is carried out by the MME using international mobile subscriber identity (IMSI), unused EPS authentication vectors, key set identifier access security management entries (KSI-ASME) and key access security management entries (KASME).

Step 6: After the authentication procedure is completed, the MME responds back to the eNB with a message containing three messages. The messages include S1AP Initial Context Setup Request, NAS Attach Accept and Activate Default Bearer Request. The message is identified by the S1AP ID that was sent in the initial UE message. The message contains maximum bit rate information for the UE. Quality of service information for the new eRAB is also specified (QCI, maximum bit rate downlink and uplink). The information received in this message will be used to setup radio resources for the eNodeB.

Step 7: eNB responds by sending RRC Connection Reconfiguration message to activate default radio bearer. The message carries the Attach Accept message as NAS payload. The RRC Connection Reconfiguration message consists of DRX information. The DRX information is for both long and short DRX if implemented in the network.

Step 8: The UE sends RRC Reconfiguration Complete message to acknowledge the completion of RRC reconfiguration.

Step 9: After sending the RRC Reconfiguration Complete message, the UE then sends a direct transfer message to the eNB. The message contains an Attach Complete message. The Attach Complete message contains EPS bearer identity, NAS sequence number, NAS-MAC, etc.

Step 10: Following the Attach complete message, the initial Default bearer setup is complete.

For the same process instead of default bearer setup, if dedicated bearer setup is required then RRC Reconfiguration message needs to be compatible with the eNB. The message needs to be successfully honored by the UE by sending RRC Reconfiguration Complete message.

FIG. 5 shows a diagram 500 showing a communication flow between a UE and an eNB of a network that for an abnormal attach procedure in a call, in accordance with one embodiment. As an option, the diagram 500 may be implemented in the context of the details of the previous figures and/or any subsequent figure(s). Of course, however, the diagram 500 may be implemented in the context of any desired environment. Further, the aforementioned definitions may equally apply to the description below.

In the abnormal scenario, there may be no issues in initial call setup. The RRC connection is established and Attach accept from the MME is successful up to the eNB. So, the steps from Step 1 to Step 5 from the process of a successful attach procedure is followed here.

Step 1: The initial call procedure from sending a connection request to performing Authentication and Ciphering Procedure by MME is done successfully without any issues. So, the steps from Step 1 to Step 5 of successful attach procedure can be implemented.

Step 2: After receiving the Attach Accept message the eNB sends RRC Connection Reconfiguration message to the UE. The reconfiguration message contains radio bearer information along with DRX information.

Step 3: The UE checks the DRX configurations sent by the eNB. As per the standards, the value of longDRX-cycle is in number of sub-frames, i.e., the longDRX-cycle of value sf10 corresponds to 10 sub-frames, the value of sf20 corresponds to 20 sub-frames, etc. If shortDRX-cycle is also configured along with longDRX-cycle then longDRX-cycle needs to be a multiple of shortDRX-cycle value. In case, the eNB does not follow the above criterion then the UE can send a non-compliant message (as per standards on device end). If the UE is unable to comply with (part of) the configuration included in the RRC Connection Reconfiguration then the UE can perform reestablishment by sending RRC Connection Reestablishment Request with cause Reconfiguration failure.

Step 4: A counter is initiated at the eNB with the cause Reconfiguration failure.

Step 5: In this case the UE will send a RRC Connection Reestablishment Request with cause of reconfiguration failure which will be rejected from the eNB.

Step 6: After the reconfiguration failure, the UE will again initiate the attach procedure by sending the RRC messages to the same eNB as the eNB is considered to have the best radio conditions in that location of the UE.

Step 7: As the eNB has non-compliant DRX parameters, the UE cannot latch to the network and may remain in a loop until the issue at eNB is resolved.

From the abnormal attach procedure, it is noted that there is a need to resolve non-compliant DRX parameter at the eNB so that the UE connects with the best radio condition successfully.

Figure 6:
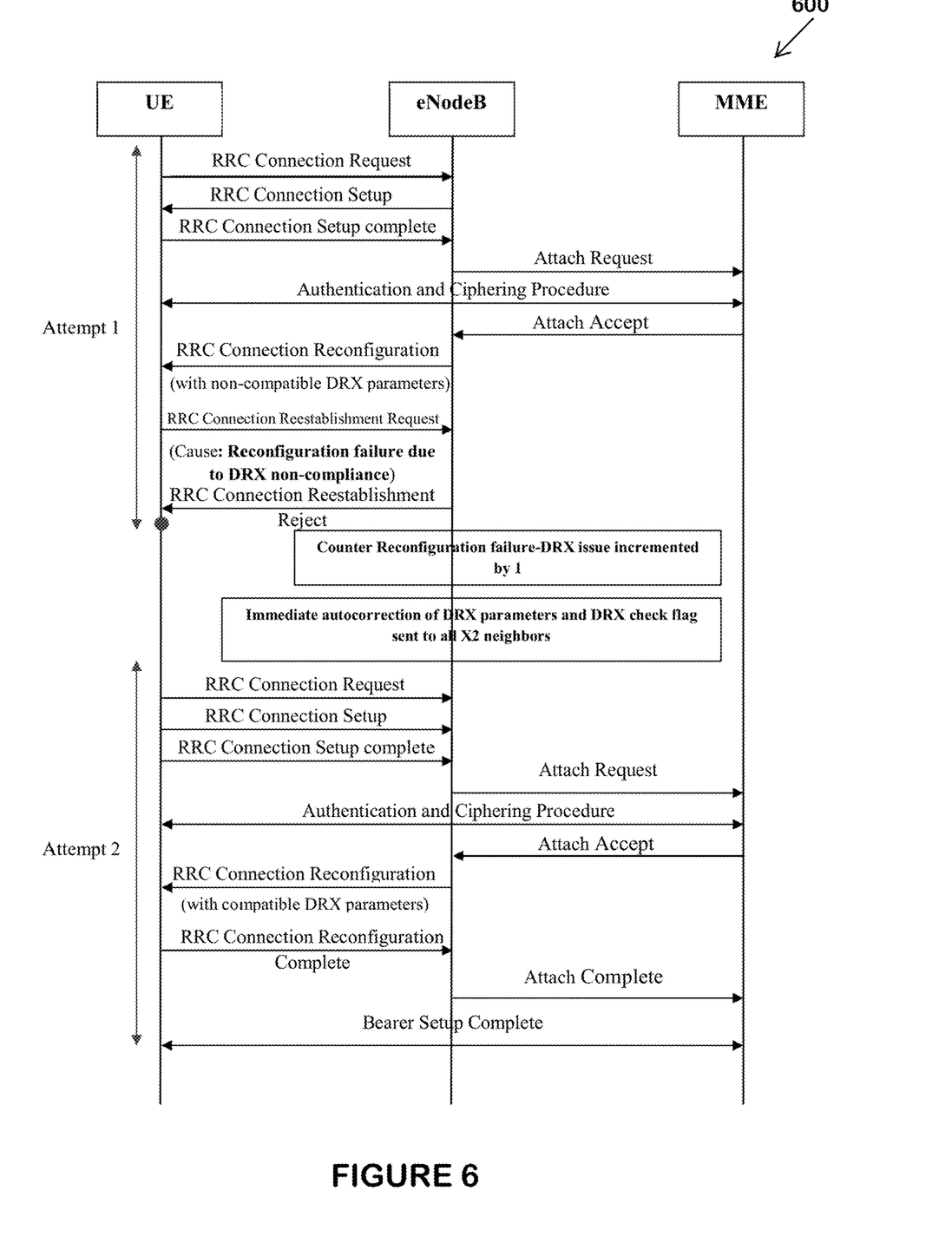
FIG. 6 shows a diagram showing a method to overcome an abnormal attach procedure, in accordance with one embodiment.

FIG. 6 shows a diagram 600 showing a method to overcome an abnormal attach procedure, in accordance with one embodiment. As an option, the diagram 600 may be implemented in the context of the details of the previous figures and/or any subsequent figure(s). Of course, however, the diagram 600 may be implemented in the context of any desired environment. Further, the aforementioned definitions may equally apply to the description below.

FIG. 6 shows the communication flow between the UE and the eNB a successful attach procedure. In the attach procedure, the initial call setup is successfully performed without any problems. So, the steps from Step 1 to Step 5 from the process of successful attach procedure is followed here.

Step 1: The initial call procedure from sending a connection request to performing Authentication and Ciphering Procedure by MME is done successfully without any issues. So, the steps from Step 1 to Step 5 of successful attach procedure can be followed.

Step 2: After receiving the Attach Accept message the eNB sends RRC Connection Reconfiguration message to the UE. The reconfiguration message contains radio bearer information along with DRX parameters.

Step 3: All OEMs may be configured in such a way that only compliant values are allowed, if compliant values are not followed then an error message will be generated. For instance, if the longDRX-cycle value is assigned then only compliant values of shortDRX-cycle will only be allowed and if shortDRX-cycle is assigned then only compliant values of longDRX-cycle will only be allowed. For values that are not compliant then the system will pop an error message. This process will prevent the usage of non-compliant values in the following stages.

Step 5: After Reconfigurationfailure-DRXissue counter is incremented the eNB will immediately autocorrect non-compliant values to compliant values. The eNB will autocorrect non-compliant short or long DRX values to compliant values.

Step 6: Following the autocorrection of the serving eNB, the eNB will send a "DRX Check" flag on X2 link that allows checking for non-compliant values of DRX parameters in neighboring eNBs of the serving eNB. If the neighboring eNBs are non-compliant then autocorrection will be performed in the say way performed in the serving eNB. This operation will ensure that no issues will take place when a handover is performed to other cells.

Step 7: The device performs RRC connection with the same eNB and the UE will send an attach request. By using the proposed method there will be no failure as the DRX values in RRC reconfiguration will be compliant with the device. So, the Attach complete will be sent to the eNB successfully.

Step 8: The process followed for auto-correction is not limited to initial bearer setup DRX profile, it will also check the DRX profiles for the bearers linked to different QCIs and autocorrects all of them.

With respect to an autocorrection mechanism to be deployed from operators, the autocorrection mechanism is performed in both serving eNB and neighboring eNBs, which may be implemented three methodologies. The method selected from the methodologies for autocorrection may be dependent on OEM's/operator.

Methodology 1: In this method, if an eNB is detected with non-compliant DRX configuration then the non-compliant eNB can set the DRX parameters values to the default value as per OEM manual or guidelines.

Methodology 2: In this method for auto-correction, all the connected eNBs can take the set parameters for long DRX value as a reference and autocorrect the short DRX value to the nearest currently available short DRX compliant value with respect to the long DRX.

Methodology 3: In this method for auto-correction, all the connected eNBs can keep long DRX parameter value without changing its value and auto-disabling the short DRX cycle.

Figure 7:
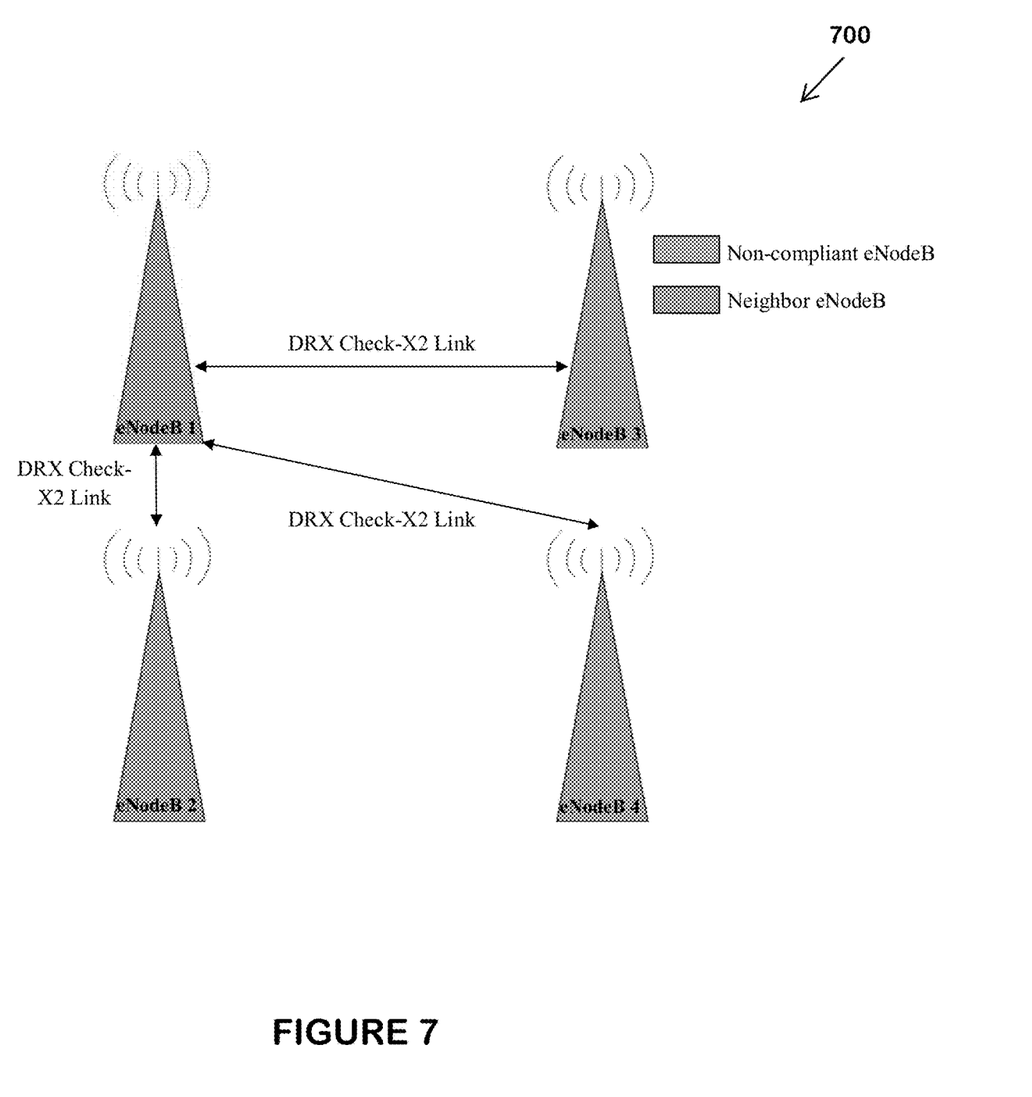
FIG. 7 shows a diagram showing an autocorrection mechanism in a neighbor eNodeB, in accordance with one embodiment.

FIG. 7 shows a diagram 700 showing an autocorrection mechanism in neighbor eNodeB, in accordance with one embodiment. As an option, the diagram 700 may be implemented in the context of the details of the previous figures and/or any subsequent figure(s). Of course, however, the diagram 700 may be implemented in the context of any desired environment. Further, the aforementioned definitions may equally apply to the description below.

Referring to FIG. 7, four eNodeBs, eNodeB 1, eNodeB 2, eNodeB 3 and eNodeB 4 are shown. The eNodeB 1 is considered a non-compliant eNB and the remaining eNodeBs, eNodeB 2, eNodeB 3 and eNodeB 4 are compliant eNBs. If the eNodeB 2 becomes non-compliant then the eNodeB 2 autocorrects itself using the autocorrection mechanism based on any of the methodologies mentioned above.

The eNodeB 2 then sends "DRX Check" flag on X2 link to the eNodeB 1, eNodeB 3 and eNodeB 4. Based on the DRX Check flag the neighbor eNBs (eNodeB 1, 3 and 4) check for compliance and autocorrects accordingly.

Thus, the problems due to non-compliant DRX configurations can be resolved by using the present system/method. The UE can be able to attach to the network easily without any issues. Even if the non-compliant DRX parameters are present in the neighboring eNBs the present invention will autocorrect them using the proposed novel methodologies.

The proposed values of present invention are listed in the following. Reconfiguration failure due to DRX value non-compliance: UE sends a reason code "Reconfiguration failure due to DRX value non-compliance" in case of reconfiguration failure due to non-compliant DRX values. Reconfigurationfailure-DRXissue: A counter "Reconfigurationfailure-DRXissue" at eNodeB is implemented for keeping a count on occurrence of reconfiguration failure due to non-compliant DRX values. DRX Check: A "DRX Check" flag is sent by an eNB to its immediate neighbor eNBs to check for compliance in DRX parameters.

Figure 8:
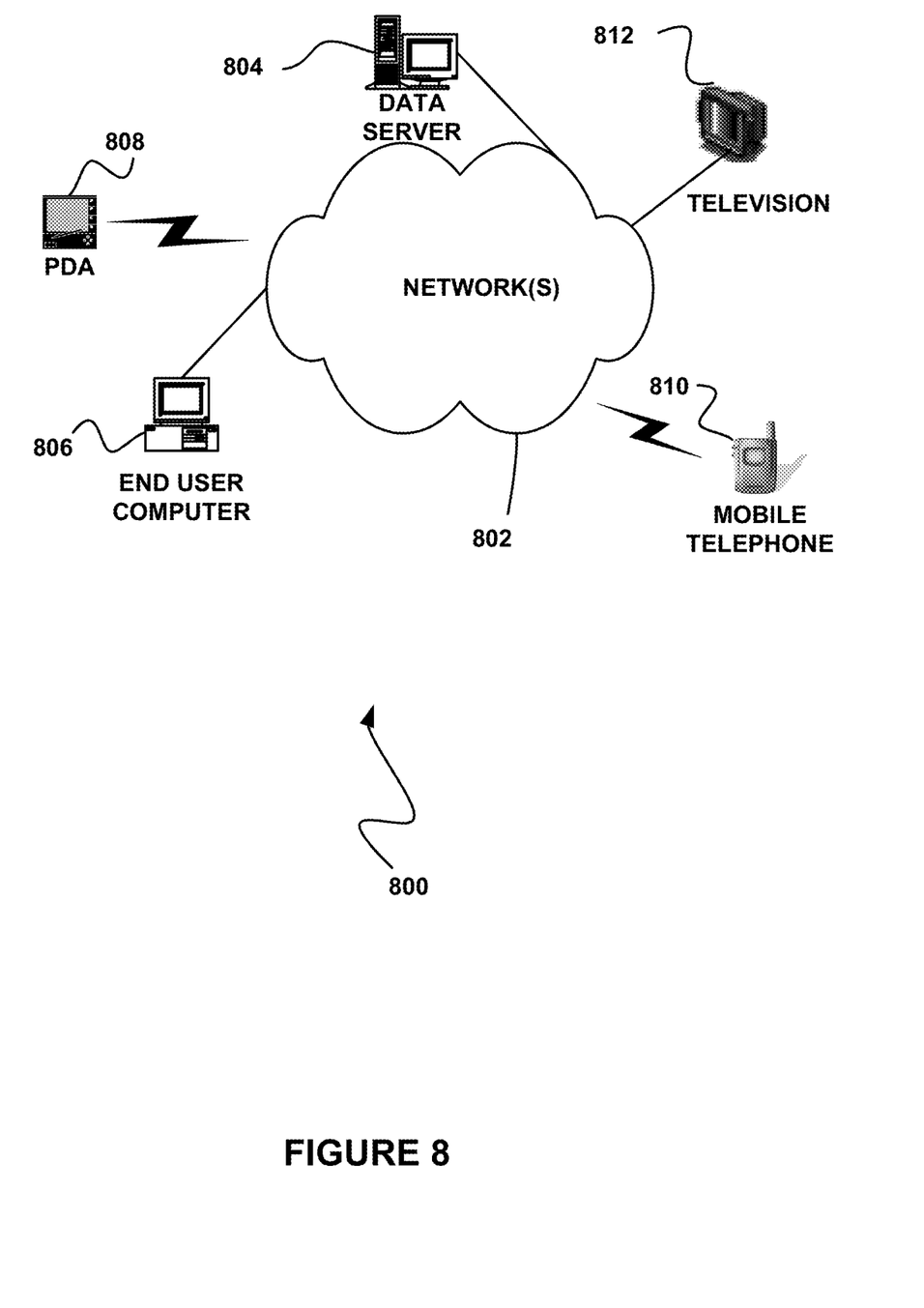
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
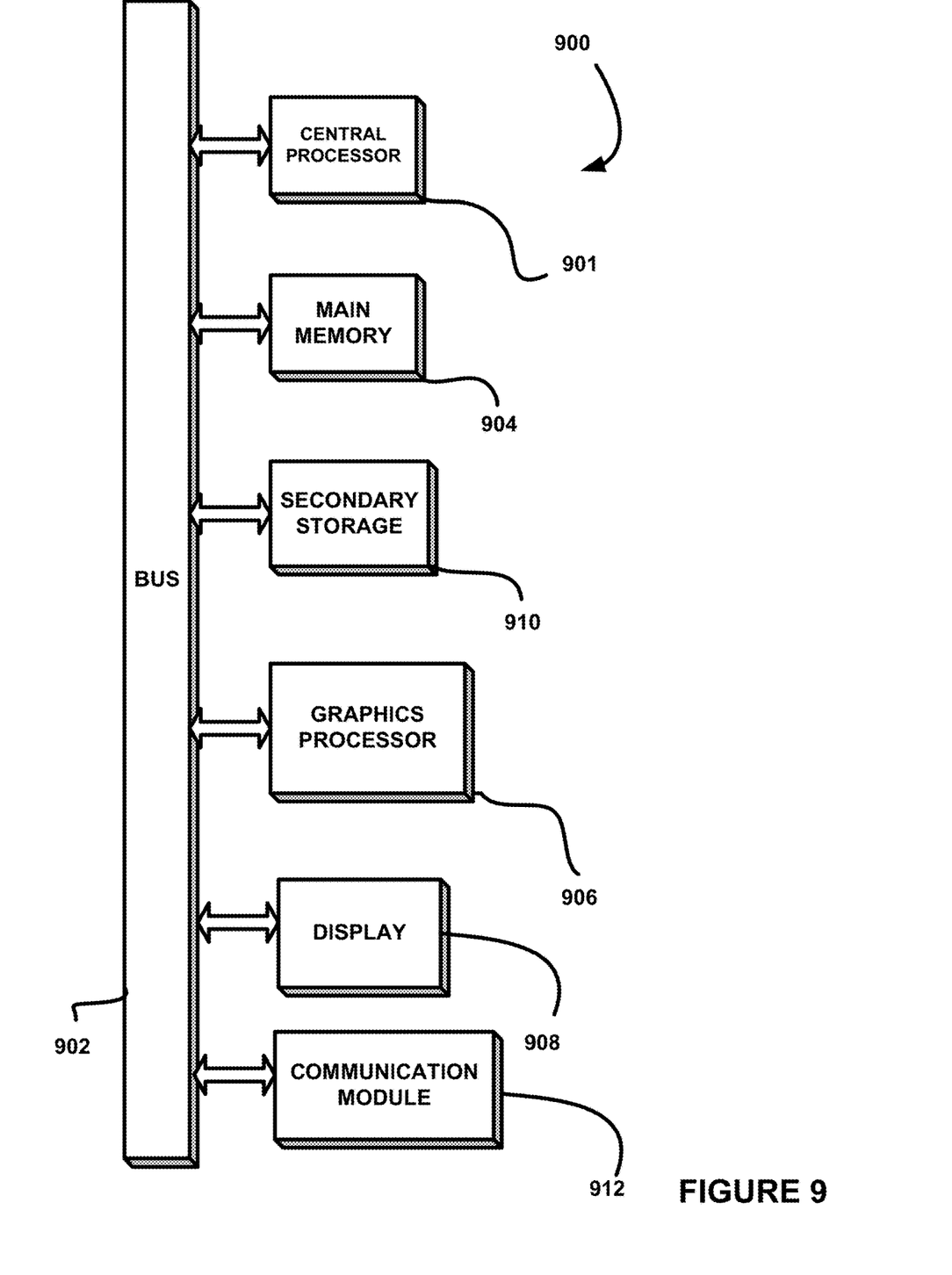
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   checking, by a user device, discontinuous reception (DRX) parameters received by the user device from an eNodeB (eNB);
   based on the checking, detecting, by the user device, non-compliant DRX parameters causing a reconfiguration failure by the user device and preventing the user device from connecting to a network;
   responsive to detecting the non-compliant DRX parameters, sending, by the user device to the eNB, a non-compliant message to cause the eNB to autocorrect the non-compliant DRX parameters to compliant DRX parameters, the non-compliant message indicating the non-compliant DRX parameters as a cause for a reconfiguration failure by the user device,
   wherein sending the non-compliant message to the eNB further causes the eNB to send a flag to neighboring eNBs to cause any of the neighboring eNBs having the non-compliant DRX parameters to perform autocorrection of the non-compliant DRX parameters to the compliant DRX parameters;
   after sending the non-compliant message to cause the eNB to autocorrect the non-compliant DRX parameters to compliant DRX parameters, receiving, by the user device from the eNB, the compliant DRX parameters allowing the user device to connect to the network.

2. The method of claim 1, wherein the DRX parameters include a short DRX cycle and a long DRX cycle.

3. The method of claim 2, wherein the long DRX cycle is required to be a multiple of the short DRX cycle in order for the DRX parameters to be compliant.

4. The method of claim 1, wherein the user device is a mobile phone.

5. The method of claim 1, wherein sending the non-compliant message to the eNB initiates a counter in the eNB.

6. The method of claim 1, wherein sending the flag to the neighboring eNBs ensures that no issues will take place when a handover is performed for the user device.

7. The method of claim 1, wherein the DRX parameters control the monitoring of a downlink channel by the user device.

8. The method of claim 7, wherein the DRX parameters include timers to start and stop the monitoring of the downlink channel by the user device.

9. The method of claim 8, wherein the DRX parameters are utilized by the user device to reduce power consumption by stopping the monitoring of the downlink channel for periods of time.

10. The method of claim 1, wherein the non-compliant message is sent as part of a radio reestablishment (RRE) performed by the user device.

11. The method of claim 1, wherein autocorrecting the non-compliant DRX parameters to compliant DRX parameters includes setting at least one of the DRX parameters to a default compliance value that is closest to a current setting of the eNB.

12. The method of claim 1, wherein the compliant DRX parameters include default DRX parameters values.

13. The method of claim 1, wherein the compliant DRX parameters include:
 a default value for a long parameter of the DRX parameters, and
 a nearest currently available value for a short parameter of the DRX parameters that is compliant with respect to the long parameter.

14. The method of claim 1, wherein the compliant DRX parameters include:
 an existing value for a long parameter of the DRX parameters, and
 a disabled state for a short parameter of the DRX parameters.

15. A non-transitory computer readable medium storing computer code executable by a processor to perform a method comprising:
 checking, by a user device, discontinuous reception (DRX) parameters received by the user device from an eNodeB (eNB);
 based on the checking, detecting, by the user device, non-compliant DRX parameters causing a reconfiguration failure by the user device and preventing the user device from connecting to a network;
 responsive to detecting the non-compliant DRX parameters, sending, by the user device to the eNB, a non-compliant message to cause the eNB to autocorrect the non-compliant DRX parameters to compliant DRX parameters, the non-compliant message indicating the non-compliant DRX parameters as a cause for a reconfiguration failure by the user device,
 wherein sending the non-compliant message to the eNB further causes the eNB to send a flag to neighboring eNBs to cause any of the neighboring eNBs having the non-compliant DRX parameters to perform autocorrection of the non-compliant DRX parameters to the compliant DRX parameters;
 after sending the non-compliant message to cause the eNB to autocorrect the non-compliant DRX parameters to compliant DRX parameters, receiving, by the user device from the eNB, the compliant DRX parameters allowing the user device to connect to the network.

16. A user device, comprising:
a non-transitory memory storing instructions; and
one or more processors in communication with the non-transitory memory that execute the instructions to perform a method comprising:
checking discontinuous reception (DRX) parameters received by the user device from an eNodeB (eNB);
based on the checking, detecting non-compliant DRX parameters causing a reconfiguration failure by the user device and preventing the user device from connecting to a network;
responsive to detecting the non-compliant DRX parameters, sending, to the eNB, a non-compliant message to cause the eNB to autocorrect the non-compliant DRX parameters to compliant DRX parameters, the non-compliant message indicating the non-compliant DRX parameters as a cause for a reconfiguration failure by the user device,
wherein sending the non-compliant message to the eNB further causes the eNB to send a flag to neighboring eNBs to cause any of the neighboring eNBs having the non-compliant DRX parameters to perform autocorrection of the non-compliant DRX parameters to the compliant DRX parameters;
after sending the non-compliant message to cause the eNB to autocorrect the non-compliant DRX parameters to compliant DRX parameters, receiving, from the eNB, the compliant DRX parameters allowing the user device to connect to the network.

* * * * *